United States Patent Office 3,442,876
Patented May 6, 1969

3,442,876
NOVEL RUBBERY POLYOXYALKYLENE COPOLYMERS
Robert J. Herold, Akron, Ohio, assignor to The General Tire & Rubber Company, a corporation of Ohio
No Drawing. Filed Feb. 16, 1966, Ser. No. 527,767
Int. Cl. C08g 23/06, 23/20
U.S. Cl. 260—80.3      6 Claims

ABSTRACT OF THE DISCLOSURE

Novel solid polyoxyalkylene copolymers having superior resistance to the degradative effects of ozone are obtained by the copolymerization of at least one polymerizable saturated epoxide monomer and at least one polymerizable epoxide monomer containing non-terminal olefinic unsaturation. There, also, may be copolymerized with these monomers terminally unsaturated polymerizable epoxide monomers.

---

This invention relates to novel polyoxyalkylene copolymers. More particularly, this invention is concerned with the copolymers of epoxides wherein the polymerization takes place through the epoxide groups, such copolymers having greatly improved resistance to the degradation effects of ozone.

Heretofore, it has been known that epoxides could be polymerized to yield high molecular weight solids and liquids which were useful as plasticizing agents for resins as lubricants and as intermediates for use in the food, pharmaceutical and textile industries. These epoxide polymers were prepared from monomeric epoxides which were saturated aliphatic epoxide compounds.

It was also known wherein high molecular weight solid copolymers of epoxides could be produced wherein at least one of the epoxides contained terminally unsaturated groups. These copolymers were shown to be curable to elastomeric materials employing sulfur curing agents.

It has been discovered that new and interesting copolymers of epoxides containing all of the advantages of the heretofore known copolymeric epoxide compositions and, in addition, having greatly superior resistance to the degradative effects of ozone can be obtained by the copolymerization of at least one saturated epoxide with at least one epoxide containing non-terminal olefinic unsaturation.

In accordance with this invention polyoxyalkylene copolymers comprising units derived from one or more saturated 1,2-alkylene oxides and one or more epoxide compounds containing non-terminal olefinic unsaturation have greatly increased resistance to the degradative effects of ozone. The polyoxyalkylene copolymers of this invention are copolymers of 1,2-alkylene oxides, with at least one epoxide containing a non-terminal olefinic double bond wherein the polymerization takes place only through the epoxide groups thereby yielding compositions which are hereinafter referred to as solid copolymeric polyoxyalkylene ethers.

The solid copolymeric polyoxyalkylene ethers encompassed by this invention are those having the following general structural units:

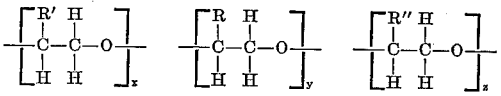

wherein, x and y are integers having values of at least one and z is an integer having a value of zero or more, R is hydrogen or a hydrocarbon radical free of ethylenic and acetylenic unsaturation containing from 1 to 12 carbon atoms, or a hydrocarbonoxy or hydrocarbonoxy alkyl radical free of ethylenic and acetylenic unsaturation containing 1 to 12 carbon atoms. R' is an olefinically unsaturated hydrocarbon radical containing from 4 to 12 carbon atoms having the formula:

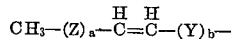

wherein $a$ is an integer of zero or one, $b$ is an integer of at least one, Z is a divalent alkylene or cycloalkylene group and Y is a divalent alkylene or cycloalkylene group or R' is a hydrocarbonoxy alkylene group of the formula:

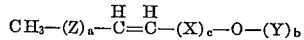

wherein, X is a divalent alkylene or cycloalkylene group, $c$ is an integer of at least one and Y, Z, $a$ and $b$ are as previously defined. R'' can be any of the groups defined by R and in addition, can be a terminally unsaturated hydrocarbon radical, a terminally unsaturated hydrocarbonoxy radical or a terminally unsaturated hydrocarbonoxy alkyl radical.

The hydrocarbon radicals which R represents are for example, alkyl groups such as methyl, ethyl, propyl, hexyl, isobutyl, octadecyl and the like; aryl groups such as phenyl, naphthyl and the like; alkaryl groups such as tolyl, xylyl, and the like; and aralkyl groups such as benzyl, phenylethyl, phenylpropyl and the like.

The olefinically unsaturated hydrocarbon radicals which R' represents include 2-pentenyl

4-propenyl cyclohexyl, crotyl, 3-hexenyl, 3-pentenyl, 4-phenyl-2-butenyl and 2,3-dimethyl-2-butenyl. The olefinically unsaturated hydrocarbonoxy radicals which R' represents include 2-butenyloxy, 2-pentenyloxy, 3-pentenyloxy, 3-hexenyloxy, 4-propenylcyclohexyloxy, 4-phenyl-2-butenyloxy, 2,3-dimethyl-2-butenyloxy and the like.

The terminally unsaturated hydrocarbons represented by R'' include vinyl, allyl, 1-butenyl, 1-pentenyl and the like. The terminally unsaturated hydrocarbonoxy radicals which R'' represents include vinyloxy, allyloxy, 1-pentenyloxy and the like. The divalent alkylene groups represented by X, Y and Z are for example, methylene ($-CH_2-$), ethylene ($-CH_2CH_2-$), propylene, butylene and the like. The divalent cycloalkylene groups represented by X, Y and Z include cyclopentylene, cyclohexylene, cycloheptylene and the like.

Illustrative of the copolymeric polyoxyalkylene ethers are copolymers of propylene oxide and crotyl glycidyl ether, copolymers of 1-glycidoxy-4-methylpentene-3 and propylene oxide, copolymers of 1,2-epoxy-3-methyl-4-propenyl cyclohexane and propylene oxide, copolymers of 1,2-epoxy-3-methyl-5-propenyl cyclohexane and propylene oxide, copolymers of 1-glycidoxy pentene-3 and 1,2-butylene oxide, copolymers of 3-glycidoxy cyclohexene and pentylene oxide and the like.

The copolymeric polyoxyalkylene compositions of this invention also include compositions containing, in addition to the non-terminally unsaturated epoxide group, epoxide groups wherein the unsaturated groups are terminal olefinically unsaturated groups such as, for example, a copolymer of butadiene monoxide, crotyl glycidyl ether and propylene oxide; a copolymer of allyl glycidyl ether, crotyl glycidyl ether and propylene oxide; a copolymer of vinyl cyclohexane monoxide, 1,2-epoxy hexane, propylene oxide and ethylene oxide; a copolymer of allyl glycidyl ether, butylene oxide and propylene oxide; and the like.

The solid copolymeric polyoxyalkylene compositions of this invention have intrinsic viscosities of from about 0.5 to 10 deciliters/gram as measured in isopropanol or benzene at 25° C. Preferably the solid polyoxyalkylene compositions of this invention have intrinsic viscosities of from 1.5 to about 7 deciliters/gram when measured in isopropanol or benzene at 25° C.

The copolymeric polyoxyalkylene ethers of this invention are produced by the polymerization through the epoxide linkage of an epoxide monomer containing a nonterminal olefinically unsaturated group with one or more saturated epoxides employing an organo-metallic catalyst system such as zinc dialkyl and water wherein the ratio of dialkyl and zinc to water is from 1.0 to .2 to 1.0 to 1.3 in accordance with the procedure described by Furukawa et al. in Journal of Polymer Science, July 1959, pages 541–543. Other catalysts can also be employed such as, for example, the double metal cyanides such as zinc ferricyanide and zinc cobalticyanide.

The process can be conducted in the absence of a solvent or it can be conducted in the presence of a solvent, for the epoxide monomers employed and the solid copolymeric polyoxyalkylene produced. It is preferred to employ a solvent which is inert to the catalyst and to the reactants such as normal hexane, cyclohexane, benzene, methylene chloride, ethyl ether and the like, since such solvents provide a means for a system which is easily handled and also provides a means for the dissipation of the heat of reaction. The amount of such solvent employed is not narrowly critical and the proportions to be employed would be obvious to one skilled in the arts.

The temperature at which the reaction is conducted is not narrowly critical and can be from 20° C. to 150° C. It is preferred to conduct the reaction at from about 50° C. to about 90° C. since the reaction in this temperature range is not uncontrollably fast nor is it so slow as to take an inordinate amount of time to go to completion.

The amount of the catalyst employed in the process is not narrowly critical and can be from about .001 part by weight per 100 parts of the monomers charged to about 10 parts by weight to 100 parts by weight of the monomers charged.

The process can be conducted at atmospheric pressure, at superatmospheric pressure or subatmospheric pressure. It is preferred to conduct the reaction under the autogenous pressure of the specific monomers employed.

The epoxide monomers containing the internal olefinically unsaturated groups which can be employed in the production compositions of the invention are those epoxides containing internal olefinic unsaturation wherein such internal unsaturation is separated from the epoxide group by at least one methylene group and wherein such olefinic unsaturation is not conjugated with aromatic groups or carboxyl groups. Such internally olefinically unsaturated epoxides include crotyl glycidyl ether, 1-glycidoxy-4-methyl pentene-3, 1,2-epoxy-3-methyl-4-propenyl cyclohexane, 1-glycidoxy pentene-3, 1,2-epoxy hexene-4, 3-glycidoxy cyclohexane, and the like.

The saturated epoxide monomers which can be employed in the production of the compositions of this invention include ethylene oxide, propylene oxide, 1,2-butylene oxide, 2,3-butylene oxide, 1,2-pentene oxide, phenyl glycidyl ether, propyl glycidyl ether, gamma-trimethylsilyl propylene oxide, butyl glycidyl ether and the like.

The epoxide monomers containing terminal unsaturation which can be employed in the production of the compositions of this invention include allyl glycidyl ether, 1-butenyl glycidyl ether, 1-pentenyl glycidyl ether, 1,2-epoxy hexene-5, butadiene monoxide, vinyl cyclohexene monoxide, and the like.

The improved copolymeric polyoxyalkylene ethers of this invention can also be produced in accordance with the process set forth in United States Patent 3,135,705 as well as by other methods which have been employed to polymerize propylene oxide to solid polymers which are known to the art.

The compositions of the present invention can be placed on a rubber mill and compounded with the normal rubber compounding ingredients such as curing agents, fillers, anti-oxidants and the like and cured to yield elastomers. Such curing agents are, for example, sulfur, mercaptobenzothiazole, benzothiazyldisulfide, tetramethylthiuram monosulfide, zinc oxide, stearic acid. The fillers are, for example, carbon black, silica, alumina, calcium carbonate, diatomaceous earth and the like. The antioxidants are, for example, nickel, dibutyldithiocarbamate, phenyl alpha naphthylamine, phenyl beta naphthylamine, 2,6-ditertiary butyl paracresol and the like.

OZONE TEST PROCEDURE

In testing for ozone resistance, the tests were conducted in a cabinet which contained a concentration of 50 parts ozone per 100 million parts air. The bent loop test consists of taking a 1″ x 4″ strip of the cured rubber with 1″ section of the longest dimension being clamped together leaving 3″ of the rubber bent and exposed to the effects of the ozone atmopshere.

A second test for ozone resistance comprised gluing samples to a belt which was continuously being driven about a path of unequal curvature so that the rubber was continually flexed and exposed to an atmosphere containing 50 parts ozone per 100 million parts air.

A third test for ozone resistance comprised exposing stretched samples to an atmosphere comprising 50 parts ozone per 100 million parts of air.

These elastomers are useful in producing mechanical rubber goods, hoses, engine mounts, and the like which can be used in environments which contain high percentages of ozone, since these compositions are extremely resistant to the degradative effects of ozone.

The following examples serve to further illustrate this invention and are not to be construed as limitations thereon. In the examples all parts are by weight unless otherwise specifically set forth.

EXAMPLE I

In conducting the reactions, a solution (I) was prepared by adding diethyl zinc (2.05 cc.) to 50 cc. of propylene oxide in an inert atmosphere. The second solution (II) was prepared by adding water (0.60 cc.) to propylene oxide, 55 cc. Solution II was then added to Solution I with rapid stirring to form Solution III. Solution III was used as a standard solution in the experiments.

The reactions were carried out in capped crown bottles. The reagents were added to the crown bottle at room temperature by means of a syringe through a butyl rubber bottle gasket. After the addition of the reagents the rubber bottle gasket was replaced by an unpunctured gasket linked with Teflon. The bottles were then placed in a water bath at 80° C. and polymerized for 18 hours. These experiments were conducted in accordance with the following recipes as given in Table I.

TABLE I

|  | A | B | C | D |
|---|---|---|---|---|
| Solution III, cc | 6.1 | 6.1 | 3.0 | 3.0 |
| Moles ZnEt₂ | .0016 | .0016 | .0079 | .0079 |
| Propylene Oxide, cc | 4.4 | 4.8 | 4.4 | 7.8 |
| Crotyl Glycidyl Ether, cc | 2.3 | .64 | 2.3 | .64 |
| Mole percent of CGE (of monomers) | 10.8 | 3.2 | 10.8 | 3.2 |
| Heptane, cc | 78 | 78 | 78 | 78 |

The heptane was then evaporated to yield the solid copolymeric polyoxyalkylene ethers.

Example II

The procedure followed was the same as that set forth in Example I. Employing the recipe given in Table II, the polymerization was carried out for 18 hours at 80° C.

TABLE II

|  | A | B |
|---|---|---|
| Moles ZnEt₂ | 1.0 | 0.50 |
| Mole Ratio H₂O/ZnEt₂ | .67 | .67 |
| Mole percent of Propylene Oxide | 90 | 97 |
| Crotyl Glycidyl Ether (Mole percent) | 10 | 3 |
| Polymer Yield, Percent | 97 | 94 |
| Unsaturation (Milliequivalent/gm.) | 1.418 | 0.475 |

The polymers produced in Example II were compounded on a two roll rubber mill according to standard compounding techniques; copolymer A was compounded according to the following recipe.

10 mole percent unsaturation

| | |
|---|---|
| Polymer | 100 |
| Carbon black | 50 |
| Stearic acid | 1 |
| Nickel dibutyl dithiocarbamate | 3 |
| Sulfur | .8 |
| Monex (tetra methylthiuram monosulfide) | .6 |
| Zinc oxide | 3 |

Copolymer B was compounded in accordance with the following recipe.

3 mole percent unsaturation

| | |
|---|---|
| Polymer | 100 |
| Carbon black | 50 |
| Stearic acid | 1 |
| Nickel dibutyl dithiocarbamate | 1 |
| Sulfur | .8 |
| Monex | 1.2 |
| Zinc oxide | 3 |

The compounded materials were cured at 300° F. for 60 minutes in a standard rubber test mold (6" x 6" x .075"). In the bent loop ozone test as hereinabove described, the samples took six and seven months respectively for appearance of the first cracks. By way of comparison, elastomers prepared from copolymers of allyl glycidyl ether and propylene oxide in the same proportion employing the above recipes for less than three months for the appearance of the first cracks.

Example III

Propylene oxide, allyl glycidyl ether, and crotyl glycidyl ether were polymerizezd to yield a polymer in accordance with the following procedure:

The reactor vessel was a crown bottle having a rubber gasket. The bottle was flushed with nitrogen and then the following mixture charged into the bottle: 52 cc. of propylene oxide, .6 cc. zinc diethyl, 4.5 cc. of a mixture of 150 cc. of propylene oxide and 2 cc. of water, 10 cc. of a mixture of 150 cc. of propylene oxide and 4.5 cc. of 4,4'-methylene bis 2,6-ditertiary butyl phenol, .06 cc. of nitrobenzene, 4 cc. of allyl glycidyl ether, 1,3 cc. of crotyl glycidyl ether, and 470 cc. of hexane.

The bottle containing this mixture was placed in a polymerizer at 80° C. and polymerized for 24 hours to yield a solid copolymeric polyoxyalkylene ether containing 3.4 mole percent allyl glycidyl ether, 1 mole percent crotyl glycidyl ether, and 95.6 mole percent propylene oxide. This copolymer had an unsaturation content of .75 millimole per gram.

A control polymer (A) containing 95 mole percent propylene oxide and 5 mole percent allyl glycidyl ether was prepared in substantially the same manner to yield a polymer containing .86 millimoles of unsaturation per gram of polymer.

An additional control sample (B) was prepared using glycidyl crotonate. Each polymer was compounded in accordance with the following recipe:

| | Parts |
|---|---|
| Rubber | 100 |
| Carbon black | 50 |
| Stearic acid | 1 |
| Zinc oxide | 3 |
| NBC (nickel dibutyl dithiocarbamate) | 1 |
| Sulfur | .8 |
| Monex | 1.0 |

The compounds were cured for 60 minutes at 300° F. in a rubber mold to yield elastomers. Samples of these elastomers were tested by the bent loop ozone test hereinabove described. The copolymeric composition of this example took six weeks to crack whereas control sample (A) had cracked in only four weeks and control sample (B) containing glycidyl crotonate, in ten days, thereby showing the superior ozone resistance of the copolymeric polyoxyalkylene ethers of this invention.

EXAMPLE IV

Copolymers of propylene oxide (90 mole percent) and crotyl glycidyl ether (10 mole percent) (Polymer A), a copolymer of propylene oxide (97 mole percent) and crotyl glycidyl ether (3 mole percent) (Polymer B), and a terpolymer of propylene oxide (97 mole percent), crotyl glycidyl ether (1 mole percent) and allyl glycidyl ether (2 mole percent) (Polymer C) were prepared in accordance with the procedure of Example I. These copolymers were solid gums and were compounded according to the following recipe.

| | Parts |
|---|---|
| Copolymer | 100 |
| Nickel dibutyl dithiocarbamate | 1 |
| ISAF carbon black | 50 |
| Zinc oxide | 3 |
| Stearic acid | 1 |

In addition to the above ingredients, the compounds also contained the following ingredients in the amounts listed.

| | A | B | C |
|---|---|---|---|
| Tetra methyl thiuram disulfide | .25 | 1 | 1 |
| Tetra methyl thiuram monosulfide | 1 | 1 | 1 |
| Sulfur | 1 | 2 | 1.2 |

The compounded materials were cured for 60 minutes at 300° F. to yield elastomers having the following properties.

| | A | B | C |
|---|---|---|---|
| Tensile, p.s.i. | 2,200 | 2,810 | 2,810 |
| Modulus 300% | 1,255 | 1,080 | 1,405 |
| Elongation, percent | 540 | 680 | 610 |
| Hardness (Shore A) | 64 | 64 | 66 |
| Compression Set (22 minutes at 212° F.) | 21 | 44 | 41 |

The elastomers were tested for ozone resistance and found to be much superior to an elastomer prepared from polymers wherein the only unsaturated epoxide is a terminally unsaturated epoxide.

In the claims:
1. A solid copolymeric polyoxyalkylene compound curable to the elastomeric state, characterized by having greatly superior resistance to the degradative effects of ozone, having an intrinsic viscosity in isopropanol at 25° C. of from about 1.5 to 7 deciliters per gram and consisting essentially of units, in block or random sequence, of the general formulae

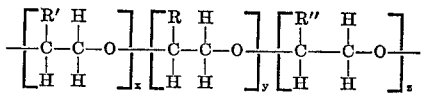

where $x$ and $y$ are integers having a value of at least one,
where $z$ is zero or an integer having a value of at least one,
where R is selected from the group consisting of hydrogen, a hydrocarbon radical, a hydrocarbonoxy radical, or a hydrocarbonoxy alkylene radical, said radical being free of ethylenic and acetylenic unsaturation and containing from 1 to 12 carbon atoms,
where R' is a non-terminally olefinically unsaturated radical selected from the group consisting of a hydrocarbon radical, a hydrocarbonoxy radical and a hydrocarbonoxy alkylene or cycloalkylene radical, said radical being free of acetylenic unsaturation and containing from 4 to 12 carbon atoms, and
where R" is a terminally olefinically unsaturated radical selected from the group consisting of a hydrocarbon radical, a hydrocarbonoxy radical and a hydrocarbonoxy alkylene or cycloalkylene radical free of acetylenic unsaturation and containing from 2 to 12 carbon atoms.

2. A compound according to claim 1 where $x$ is present in an amount of from about 1 to 10.8 mole percent and where $z$ is present in an amount of from about 2 to 5 mole percent, the balance being $y$.

3. A compound according to claim 2 where R is methyl, R' is

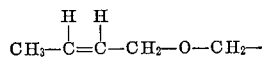

and R'' is

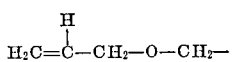

4. A compound according to claim 2 where $z$ is zero.

5. A compound according to claim 4 where R is methyl and R' is

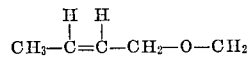

6. A compound according to claim 1 which has been cured.

References Cited

UNITED STATES PATENTS

| | | |
|---|---|---|
| 3,031,439 | 4/1962 | Bailey. |
| 3,158,591 | 11/1964 | Vandenberg. |
| 3,329,630 | 7/1967 | Hirsch. |
| 3,379,660 | 4/1968 | Hsieh. |

HARRY WONG, JR., *Primary Examiner.*

U.S. Cl. X.R.

260—41, 45.7, 45.75, 45.9, 79.5, 88.3